United States Patent [19]

Clavel et al.

[11] 4,109,778
[45] Aug. 29, 1978

[54] TRANSMISSION MECHANISM, NOTABLY FOR TYPEWRITERS

[75] Inventors: Raymond Clavel, Oulens; Ulrich Menzi, Yverdon, both of Switzerland

[73] Assignee: Hermes Precisa International S.A., Yverdon, Switzerland

[21] Appl. No.: 746,207

[22] Filed: Dec. 1, 1976

[30] Foreign Application Priority Data

Dec. 8, 1975 [CH] Switzerland .................. 15901/75

[51] Int. Cl.² .......................................... B41J 23/02
[52] U.S. Cl. .............................. 400/154.2; 400/162.1; 400/434.2
[58] Field of Search ................ 197/1 R, 16, 18, 48, 197/49, 50, 51, 52, 53, 54, 55, 56, 57, 58, 59, 114 R, 22, 27, 32; 74/89.2, 89.21, 89.22, 237

[56] References Cited

U.S. PATENT DOCUMENTS

| 638,092 | 11/1899 | Carmona | 197/51 X |
|---|---|---|---|
| 1,757,516 | 5/1930 | Degener | 197/114 R |
| 2,661,683 | 12/1953 | Beattie | 197/55 X |
| 2,911,085 | 11/1959 | Leathers | 197/1 R |
| 2,937,736 | 5/1960 | Kuntzel | 197/22 |
| 3,042,174 | 7/1962 | Howard | 197/49 X |
| 3,108,674 | 10/1963 | Byers | 197/27 |
| 3,334,719 | 8/1967 | Howard | 197/49 |
| 3,493,090 | 2/1970 | Liles | 197/52 X |
| 3,621,727 | 11/1971 | Cicognani | 74/237 X |
| 3,773,159 | 11/1973 | Koller | 197/16 |
| 3,861,511 | 1/1975 | Nelson et al. | 197/52 X |
| 3,921,782 | 11/1975 | Kunishima | 197/16 X |
| 4,000,802 | 1/1977 | Thomson | 197/27 |

Primary Examiner—Ernest T. Wright, Jr.
Attorney, Agent, or Firm—Emory L. Groff, Jr.

[57] ABSTRACT

Angular displacements of a rotary member in, for example, a typewriter are controlled by moving a guide roller to shorten and lengthen the path of an elongate flexible member attached at one end to a rotatable stationary pulley and at its other end to an attachment piece, this member being a belt having notched ends one engaging a toothing on a part of the pulley and the other an arcuate toothed segment forming the attachment piece.

5 Claims, 1 Drawing Figure

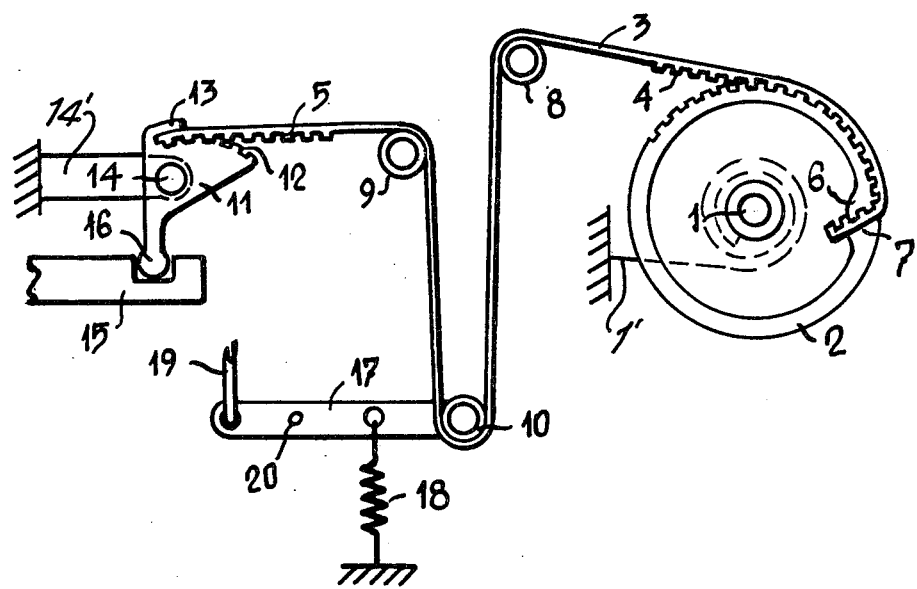

TRANSMISSION MECHANISM, NOTABLY FOR TYPEWRITERS

The invention relates to transmission mechanisms, notably for typewriters, comprising a rotary member provided with a pulley, a flexible elongate connection fixed to the pulley and to an attachment piece, and a movable member able to bear against the flexible connection between the stationary point of attachment and the pulley to modify its path and produce a corresponding angular displacement of the rotary member.

In typewriters having a printing head, all of the typeface characters are carried by a single generally spherical piece which must be able to turn about an axis to bring the chosen typeface character into the striking position. This angular displacement of the printing head must take place very rapidly and with a great precision, and the mechanism for transmitting these rotary movements must be very strong to be able to withstand years of intensive use.

An aim of the invention is to provide a transmission mechanism of the aforementioned type which permits very rapid movements and an easy initial adjustment, and is very reliable.

The mechanism according to the invention is characterized in that the pulley is formed of an at least partially toothed wheel, and the flexible connection is formed of a notched belt whose notches form a toothing engaging in teeth of the toothed wheel.

The single FIGURE of the accompanying drawing shows, schematically and by way of example, an embodiment of the invention.

The mechanism shown comprises a rotary shaft 1 carrying a pulley 2 formed on a part of its periphery as a toothed wheel. Shaft 1 is urged clockwise (looking at FIG. 1) by a spring 1' tending to opposite rotation of the pulley 2 produced by traction of a flexible connection 3 anchored on pulley 2. Flexible connection 3 is formed by a belt whose two ends 4 and 5 are notched.

The end 4 thus has a toothing whose notches engage with teeth on the pulley 2. In its periphery, the pulley 2 has a discontinuity formed by a toothed lip 6 extending generally towards the center of the pulley 2. Facing this lip 6 is a bearing surface 7, the distance between surface 7 and the toothed lip 6 corresponding to the thickness of the notched end 4. In this manner, the end 4 of the flexible connection 3 can be anchored on the pulley 2 by sliding it between the lip 6 and the surface 7 along a direction generally parallel to the shaft 1. It is easy to carry out an initial adjustment of the length of the connection 3 by placing the notches of end 4 facing chosen teeth of the pulley 2.

The connection 3 passes about two fixed rollers 8 and 9 and a movable roller 10, and its end 5 is anchored to an attachment piece 11. This piece 11 has an arcuate toothed segment 12 and a bearing surface 13 carrying out the same function as the lip 6 and the surface 7 of pulley 2, i.e. anchoring the flexible connection 3. Piece 11 is pivotally mounted on a fixed support 14' about an axis of pivoting 14 eccentric to the center of curvature of the arcuate toothed segment 12, and its position may be set by a control member 15 cooperating with a beak 16 of the attachment piece 11.

The angular displacements of the rotary member 1 are controlled by corresponding displacements of the roller 10. For this purpose, roller 10 is mounted on a lever 17 biased by a traction spring 18 and actuated by a pull-piece 19. This lever 17 pivots on a stationary pin 20. It is clear that any angular displacement of the lever 17 produces a lengthening or shortening of the path of the flexible connection 3 between the stationary rollers 8 and 9 and hence produces a corresponding angular displacement of the pulley 2.

Of course, different embodiments can be provided. One could notably use a belt toothed along its entire length and a wheel toothed about its entire periphery. Anchoring of the end 5 of the connection 3 could also be provided without employing a piece having a toothing, but in any conventional manner.

The toothed belt is advantageously formed of an elastomer reinforced with glass fibres.

We claim:

1. A transmission mechanism, notably for a typewriter, comprising a rotary member provided with a pulley, a flexible elongate connection fixed to the pulley and to an attachmemt piece, and a movable member bearing against the flexible connection between the attachment piece and the pulley to modify the path of the flexible connection and produce a corresponding angular displacement of the rotary member, wherein the pulley is formed of an at least partially toothed wheel, and the flexible connection is formed of a notched belt whose notches form a toothing engaging in teeth of the toothed wheel, the toothed wheel having means defining a discontinuity in its periphery, said discontinuity means being formed by a toothed lip extending towards the center of the toothed wheel and disposed facing a bearing surface, the distance between the bearing surface and the toothed lip corresponding to the thickness of the notched belt, whereby said toothed lip and notched belt may be readily engaged and disengaged in different relative positions for adjustment.

2. A mechanism according to claim 1, in which the notched belt is formed of an elastomer reinforced with glass fibers.

3. A mechanism according to claim 1, in which the attachment piece has an arcuate toothed segment whose toothing corresponds to that of the notched belt, said attachment piece also having a bearing surface facing a portion of the toothed segment and the bearing surface of said attachment piece corresponding to the thickness of the notched belt.

4. A mechanism according to claim 3, in which the attachment piece is pivotally mounted on a support about an axis of pivoting eccentric to the center of curvature of the toothed segment.

5. A mechanism according to claim 3 in which the flexible connection is notched at its end portions only and has a non-notched intermediate portion.

* * * * *